US008322272B1

(12) United States Patent
Wenger

(10) Patent No.: US 8,322,272 B1
(45) Date of Patent: Dec. 4, 2012

(54) METHOD FOR POSITIVE FEEDING OF PRECONDITIONED MATERIAL INTO A TWIN SCREW EXTRUDER

(75) Inventor: Marc Wenger, Sabetha, KS (US)

(73) Assignee: Wenger Manufacturing, Inc., Sabetha, KS (US)

(*) Notice: Subject to any disclaimer, the term of this patent is extended or adjusted under 35 U.S.C. 154(b) by 0 days.

(21) Appl. No.: 13/294,971

(22) Filed: Nov. 11, 2011

Related U.S. Application Data

(63) Continuation of application No. 13/275,787, filed on Oct. 18, 2011, now abandoned.

(51) Int. Cl.
*A23P 1/12* (2006.01)

(52) U.S. Cl. ............. 99/353; 99/348; 366/76.4; 366/85; 366/156.2; 366/158.4; 425/204; 425/205; 426/516

(58) Field of Classification Search .................... 99/348, 99/353; 426/516; 366/76.4, 85, 156.2, 158.4; 425/204, 205

See application file for complete search history.

(56) References Cited

U.S. PATENT DOCUMENTS

| | | | | | |
|---|---|---|---|---|---|
| 3,536,680 | A | * | 10/1970 | Illing | 526/88 |
| 3,861,287 | A | * | 1/1975 | Manser | 99/348 |
| 4,752,139 | A | | 6/1988 | Hauck | |
| 4,763,569 | A | | 8/1988 | Wenger et al. | |
| 4,981,711 | A | | 1/1991 | Kearns et al. | |
| 5,126,159 | A | * | 6/1992 | Manser et al. | 426/549 |
| 5,161,888 | A | | 11/1992 | Hauck | |
| 5,261,743 | A | * | 11/1993 | Moller | 366/196 |
| 5,296,247 | A | | 3/1994 | Huang et al. | |
| 5,480,673 | A | | 1/1996 | Rokey | |
| 5,622,744 | A | | 4/1997 | Matson et al. | |
| 5,635,237 | A | | 6/1997 | Greenberg et al. | |
| 5,783,240 | A | | 7/1998 | Wenger et al. | |
| 6,129,010 | A | | 10/2000 | Hurd et al. | |
| 6,340,487 | B1 | | 1/2002 | Wenger et al. | |
| 6,415,708 | B2 | | 7/2002 | Huber et al. | |
| 6,422,135 | B1 | | 7/2002 | Huber et al. | |
| 6,465,029 | B2 | | 10/2002 | Wenger et al. | |
| 6,482,453 | B2 | | 11/2002 | Wenger et al. | |
| 7,448,795 | B2 | | 11/2008 | Wenger et al. | |
| 7,674,492 | B2 | | 3/2010 | Wenger et al. | |
| 7,794,134 | B1 | | 9/2010 | Henry | |
| 7,906,166 | B2 | | 3/2011 | Wenger et al. | |
| 2006/0188641 | A1 | | 8/2006 | Baumer et al. | |
| 2006/0210695 | A1 | | 9/2006 | Ganjyal et al. | |

* cited by examiner

*Primary Examiner* — Yogendra Gupta
*Assistant Examiner* — Joseph Leyson
(74) *Attorney, Agent, or Firm* — Hovey Williams LLP

(57) ABSTRACT

An improved screw feeder assembly is provided for interconnection between the outlet of a preconditioner and the inlet of an extruder barrel. The assembly includes an upright housing with a pair of elongated shafts equipped with auger flighting within the housing and driven by means of motor. Preferably, the housing is mechanically coupled to the outlet and inlet with the shafts extending through the preconditioner vessel and downwardly to a point within the inlet and closely adjacent the screw(s) within the extruder barrel; the flighting is provided along the length of the housing, from a point closely adjacent the outlet and into the extruder inlet. This provides a positive conveyance of preconditioned material from the outlet to the inlet. Use of the assembly allows maintenance of superatmospheric pressures and temperatures above 212° F. within the preconditioner, which permits more efficient processing.

4 Claims, 5 Drawing Sheets

METHOD FOR POSITIVE FEEDING OF PRECONDITIONED MATERIAL INTO A TWIN SCREW EXTRUDER

CROSS-REFERENCE TO RELATED APPLICATION

This application is a continuation of U.S. patent application Ser. No. 13/275,787, filed Oct. 18, 2011, now abandoned, which is incorporated herein by reference in its entirety.

BACKGROUND OF THE INVENTION

1. Field of the Invention

The present invention is broadly concerned with improved extrusion apparatus generally including a preconditioner and an extruder, with an intermediate feeder screw assembly coupled between the preconditioner outlet and the extruder inlet in order to positively convey material being process from the preconditioner directly into the extruder. More particularly, the invention is concerned with such apparatus and corresponding methods, wherein the feeder screw assembly preferably includes a substantially closed housing with a pair of juxtaposed, intercalated auger conveying screws within the housing having flighting preferably extending from a point closely adjacent the preconditioner outlet and into the extruder inlet.

2. Description of the Prior Art

Extrusion systems are commonly used in the processing of human food or animal feed materials. Generally speaking, such systems include a preconditioner operably coupled with a downstream extruder. The preconditioner is typically in the form of an elongated vessel having internal mixing shafts operable to receive incoming material and to heat, moisturize, and agitate the material for at least partial precooking thereof. The preconditioned material then is conveyed through a simple downspout or the like under the influence of gravity into the extruder inlet. In the extruder, the material is finally processed, owing to the presence of one or more elongated, helically flighted, axially rotatable screws which convey the material along the extruder barrel and through an endmost restricted orifice die. The extruder generates additional heat, pressure and shear conditions, which effect the final cooking and forming of the extrudate.

The use of downspouts or transitions between the preconditioner outlet and extruder inlet can create significant operational and/or contamination problems. For example, owing to the fact that the preconditioner and downspout are substantially at atmospheric pressure, there is a possibility that airborne contaminants are incorporated into the material during processing. Furthermore, because the flow of material in the downspouts relies on gravity and is not positively conveyed, the material can clog within the downspout, thereby disrupting the desirable continuous flow of material between the preconditioner and the extruder.

U.S. Pat. No. 6,482,453 describes extrusion systems designed for quick changeover between different types of materials to be processed. In one embodiment, the '453 patent provides a powered, variable speed, variable output screw-type discharge feeder immediately below the preconditioner outlet. This discharge feeder is designed so as to permit variation in the residence time of the material within the preconditioner, and to assist in the desired quick changeover. However, the system of the '453 patent still relies on gravitational flow from the discharge feeder to the inlet of the downstream extruder.

There is accordingly a need in the art for improved material transfer apparatus between a preconditioner outlet and an extruder, which positively conveys preconditioned material to a downstream extruder, without full reliance upon gravitational flow. Furthermore, it would be desirable if such material transfer apparatus would allow superatmospheric pressure conditions within the preconditioner and transfer apparatus, while also permitting maintenance of temperatures above 212° F.

SUMMARY OF THE INVENTION

The present invention overcomes the problems outlined above, and provides an elongated, upright feeder screw assembly designed to be located between a preconditioner outlet and an extruder inlet in order to provide positive transport of the preconditioned material substantially throughout the length of the assembly. Generally speaking, the feeder screw assembly has an elongated upright housing presenting an upper inlet end and a lower outlet end, with a pair of juxtaposed feeder elements within the housing, each including an upright shaft supporting helical flighting along the length thereof, with a motor operably coupled with the shafts for axial rotation thereof. In preferred forms, the shafts extend through the preconditioner vessel to a point within the extruder inlet closely adjacent the extruder screw(s). Advantageously, the feeder screw housing is designed to closely mate with the preconditioner outlet and extruder inlet to create a substantially closed passageway there between. This reduces the possibility of atmospheric contamination of the material being processed, and moreover makes it possible to pressure both the preconditioner and the feeder screw housing.

The invention also includes combinations of the feeder screw assembly with a preconditioner and a downstream extruder. In such combinations, it is desirable to have the feeder screw shafts extend upwardly through the preconditioner vessel, with the drive motor of the feeder screw assembly situated atop the vessel. In order to accommodate the feeder screw shafts, the size and location of the preconditioner mixing elements may be altered.

DETAILED DESCRIPTION OF THE PREFERRED EMBODIMENT

Turning now to the figures, a processing apparatus 10 in accordance with the invention broadly includes a preconditioner 12, an extruder 14, and a feeder screw assembly 16 interconnecting the preconditioner 12 and extruder 14. The apparatus 10 is especially designed for the processing of feed or food products, typically containing quantities of protein, starch, and fat. A particular utility of the apparatus 10 is in the production of relatively dense aquatic feeds, such as shrimp feeds.

Figure 5:
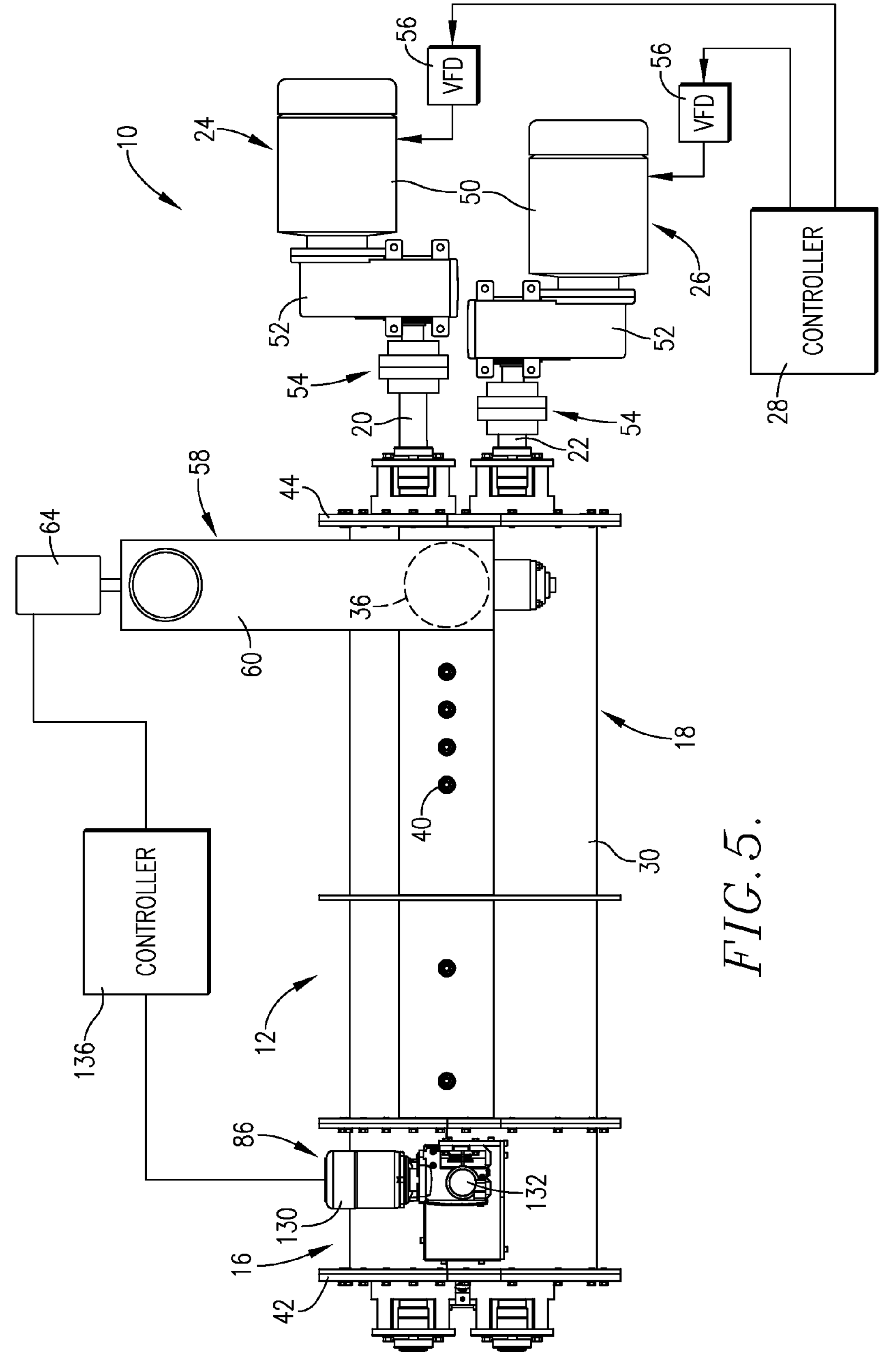
FIG. 5 is a partially schematic plan view of the FIG. 1 structure, illustrating a preferred digital control arrangement.

In more detail, the preconditioner 12 is of the type described in U.S. Pat. No. 7,674,492, incorporated by reference herein in its entirety. Broadly, the preconditioner 12 includes an elongated mixing vessel 18 with a pair of parallel, elongated, axially-extending mixing shafts 20 and 22 within and extending along the length of vessel 18. The shafts 20, 22 are operably coupled with individual variable drive devices 24 and 26 (FIG. 5), the latter in turn connected with digital control device 28.

In more detail, the vessel 18 has an elongated, transversely arcuate sidewall 30 presenting a pair of elongated, juxtaposed, intercommunicated chambers 32 and 34, as well as a material inlet 36 and a material outlet 38. The chamber 34 has a larger cross-sectional area than the adjacent chamber 32, as will be readily apparent from a consideration of FIG. 2. The sidewall 30 has access doors (not shown) and is also equipped with injection ports 40 for injection of water and/or steam into the confines of vessel 18 during use of the preconditioner 12. The opposed ends of vessel 18 have end plates 42 and 44, as shown.

Figure 2:
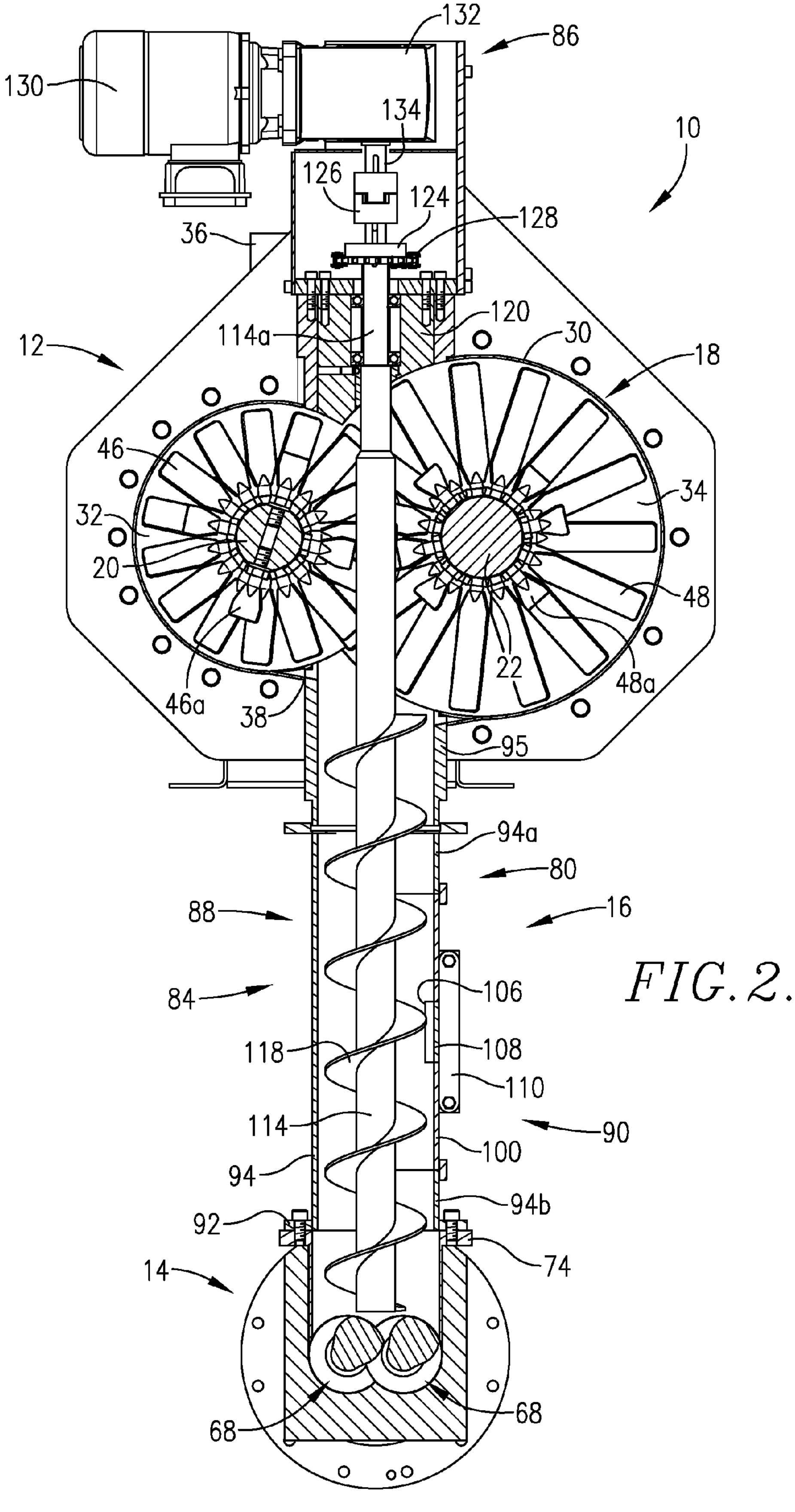
FIG. 2 is a vertical sectional view of the outlet end of the preconditioner and the feeder screw assembly illustrated in FIG. 1.
Figure 4:
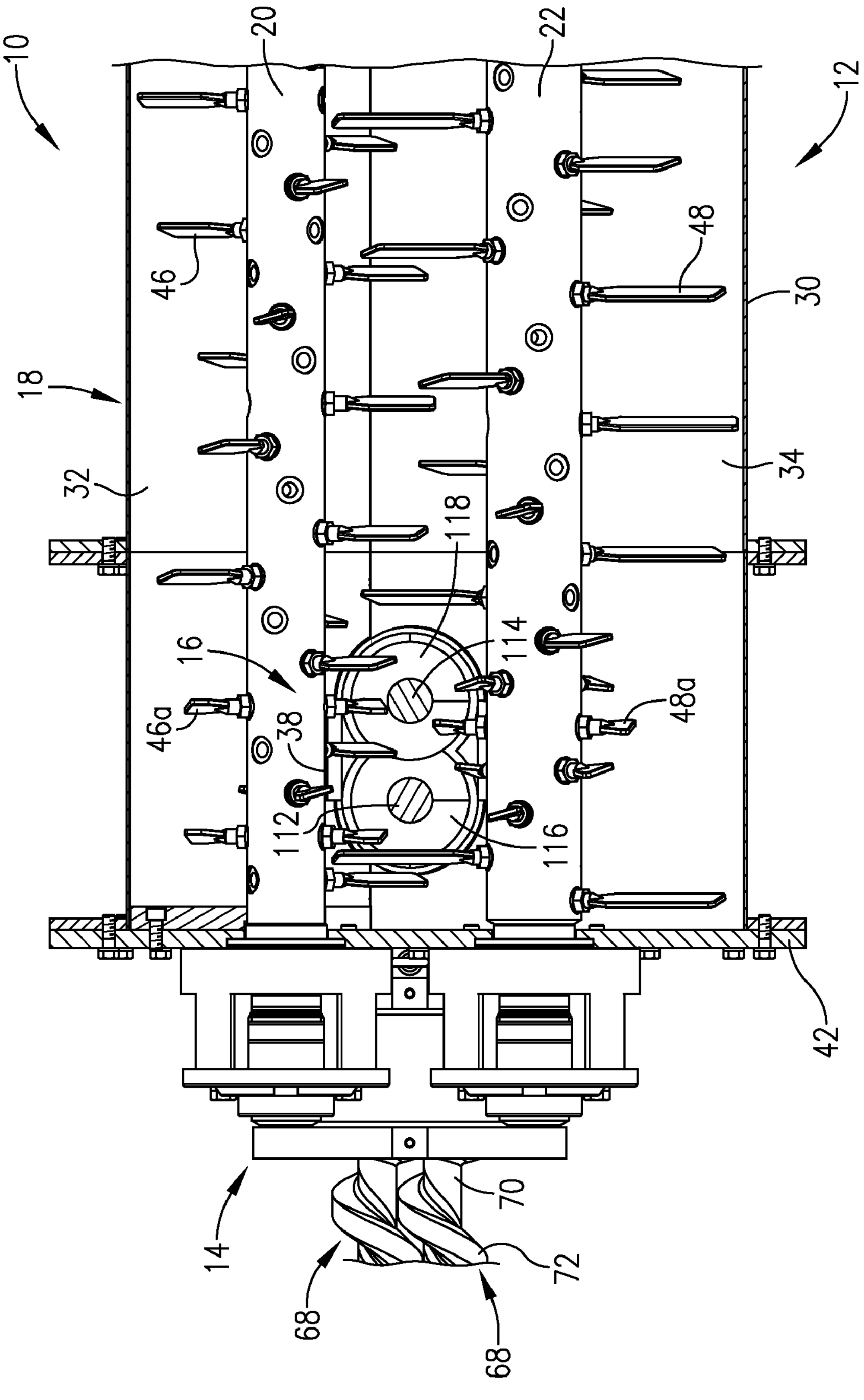
FIG. 4 is a fragmentary sectional view illustrating the outlet end of the preconditioner and the feeder screw assembly.

Each of the shafts 20, 22 has a plurality of radially outwardly-extending mixing elements 46 and 48 which are designed to agitate and mix material fed to the preconditioner 12, and to convey the material from inlet 36 towards and out outlet 38. It will be observed that the elements 46 are axially offset relative to the elements 48, and that the elements 46, 48 are intercalated (i.e., the elements 46 extend into the cylindrical operational envelope presented by shaft 22 and elements 48, and vice versa). Although the elements 46, 48 are illustrated as being substantially perpendicular to the shafts 20, 22, the invention is not so limited; rather, the elements 46, 48 are adjustable in both length and pitch, at the discretion of the user. Again referring to FIG. 2, it will be seen that the shaft 20 is located substantially along the center line of chamber 32, and that shaft 22 is likewise located substantially along the center line of the chamber 34. As best illustrated in FIGS. 2 and 4, several elements **46*a* and 48*a* adjacent the housing outlet 38 are shortened relative to the remainder of the elements 46, 48**. The importance of this feature will be made clear hereinafter.

The drives 24 and 26 are in the illustrated embodiment identical in terms of hardware, and each includes a drive motor 50, a gear reducer 52, and coupling assembly 54 serving to interconnect the corresponding gear reducer 52 and motor 50 with a shaft 20 or 22. The drives 24 and 26 also preferably have variable frequency drives (VFDs) 56 which are designed to permit selective, individual rotation of the shafts 20, 22 in terms of speed and/or rotational direction independently of each other and during high speed rotation of the shafts. In order to provide appropriate control for the drives VFDs 56, they are each coupled with a corresponding motor 50 and a control device 28. The control device 28 may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The drives 56 may be programmed as desired to achieve the ends of the invention, e.g., they may be configured for different rotational speed ranges, rotational directions and power ratings.

In preferred forms, the preconditioner 12 is supported on a weighing device in the form of a plurality of load cells (not shown), which are also operatively coupled with control device 28. The use of such load cells permits rapid, on-the-go variation in the retention time of material passing through vessel 18, as described in detail in U.S. Pat. No. 6,465,029, incorporated by reference herein.

The use of the preferred variable frequency drive mechanisms 24, 26 and control device 28 allow high-speed adjustments of the rotational speeds of the shafts 20, 22 to achieve desired preconditioning while avoiding any collisions between intermeshing mixing elements 46, 48. In general, the control device 28 and the coupled VFDs 56 communicate with each drive motor 50 to control the shaft speeds. Additionally, the shafts 20, 22 can be rotated in different or the same rotational directions at the discretion of the operator.

Retention times for material passing through preconditioner 12 may be controlled in whole or in part by manual adjustment of the shaft speeds and/or directions, or, more preferably, automatically through control device 28. Weight information from the load cells is directed to control device 28, which in turn makes shaft speed and/or directional changes based upon a desired retention time.

The preconditioner 12 is commonly used for the processing of animal feed or human food materials, such as grains (e.g., wheat, corn, oats, soy), meat and meat by-products, and various additives (e.g., surfactants, vitamins, minerals, colorants). Where starch-bearing grains are processed, they are typically at least partially gelatinized during passage through the preconditioner. The preconditioner 12 may operate at temperatures of from about 100-212 degrees F., residence times of from about 30 seconds-5 minutes, and at atmospheric or slightly above pressures. However, as explained more fully below, the provision of feeder screw assembly 16 permits additional residence time control and moreover allows the preconditioner 12 to operate at pressures above atmospheric.

The drive arrangement for the preconditioner 12 has the capability of rotating the shafts 20, 22 at variable speeds of up to about 1,000 rpm, more preferably from about 200-900 rpm. Moreover, the operational flexibility inherent in the preconditioner design allows for greater levels of cook (i.e., starch gelatinization) as compared with similarly sized conventional preconditioners.

The inlet 36 of preconditioner 12 is operably coupled with a variable speed auger conveyor 58 having a tubular housing 60 and an internal, axially rotatable conveying screw 62 therein. A variable speed drive motor 64 (FIG. 5) is coupled with auger screw 62 for controlled rotation thereof.

Figure 1:
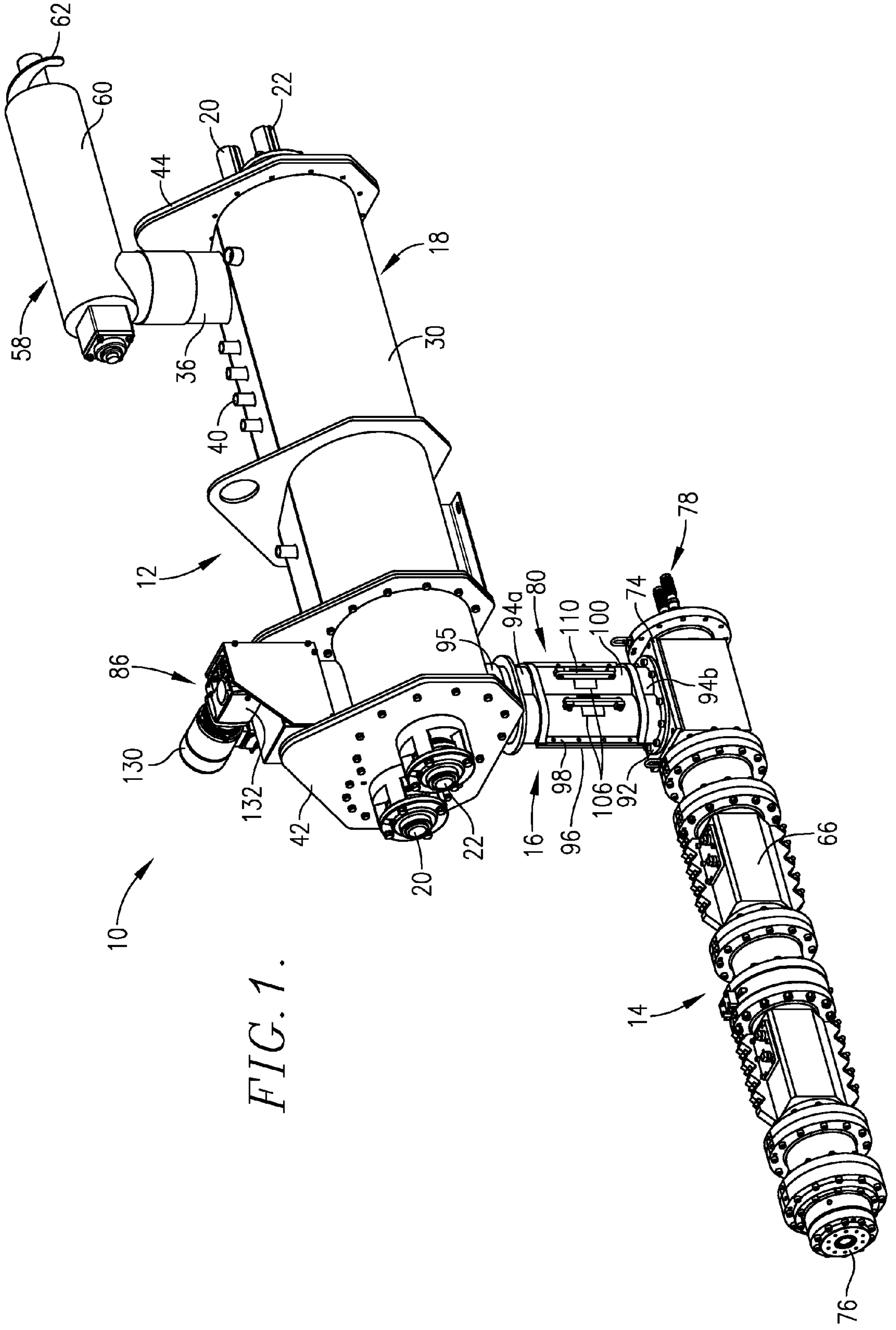
FIG. 1 is a perspective view of a preconditioner and an extruder, with the upright feeder screw assembly of the invention interconnecting the outlet of the preconditioner and the inlet of the extruder.
Figure 3:
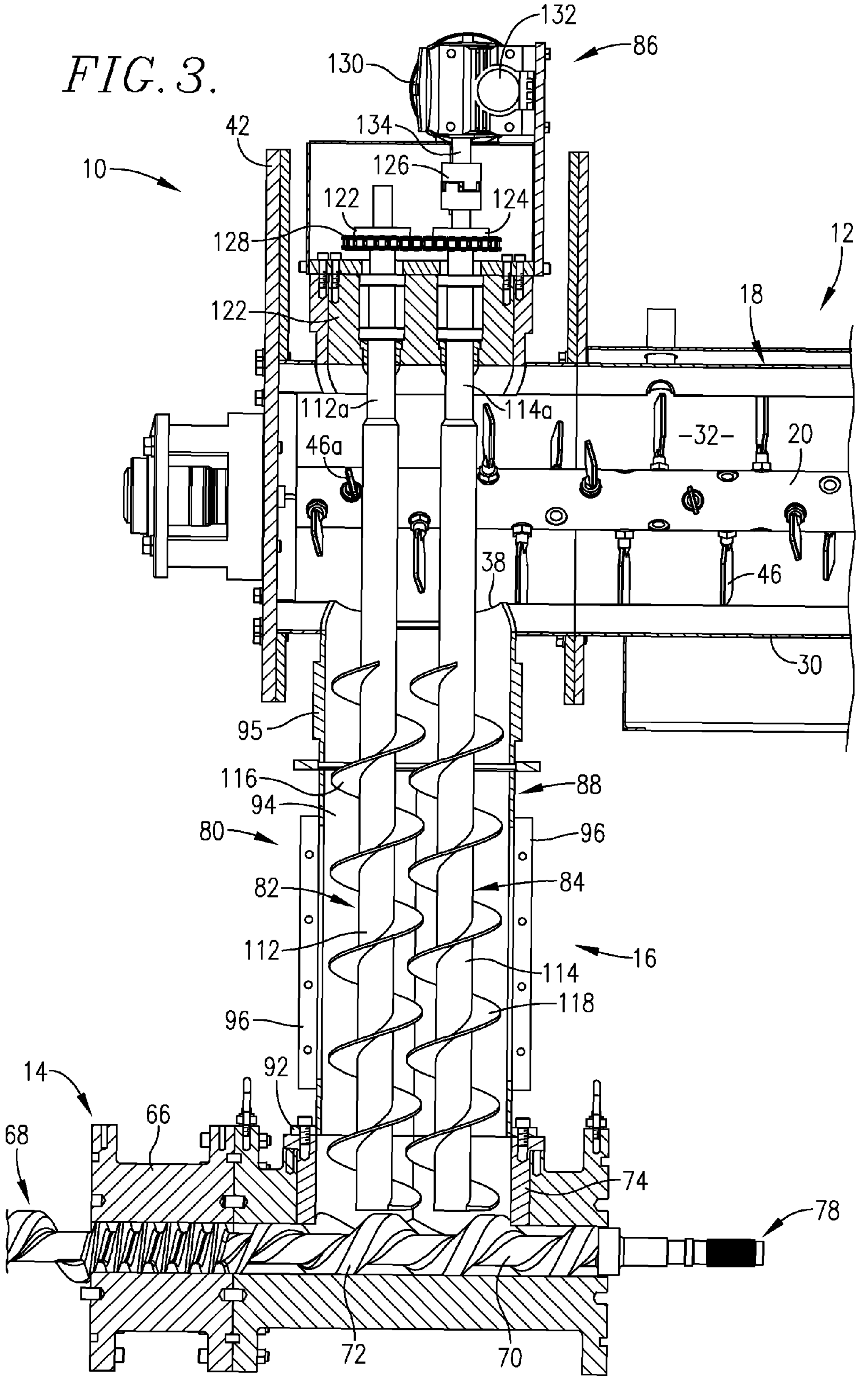
FIG. 3 is a fragmentary sectional view of the preconditioner, feeder screw assembly, and extruder depicted in FIG. 1.

The extruder 14 is itself conventional and generally has an elongated, multiple section barrel 66 with at least one elongated, axially rotatable, helically flighted screw assembly 68 therein. In the illustrated embodiment, the extruder 14 is a twin screw extruder having a pair of juxtaposed, intercalated screw assemblies 68 (FIG. 4). The screw assemblies 68 each include a central shaft 70 with outwardly extending, helical flighting 72. As best illustrated in FIGS. 1 and 3, the barrel 66 is equipped with a tubular inlet 74 and an endmost restricted orifice die assembly 76. The screw assemblies 68 are conventionally driven by means of a motor and gear reducer assembly (not shown) operatively secured to the outboard ends 78 of the shafts 70.

The purpose of extruder 14 is to receive preconditioned material from preconditioner 12, which is moisturized and partially cooked. In the extruder 14, the preconditioned material is subjected to predetermined levels of heat, pressure, and shear, with or without injection of steam and/or water into the barrel 66, in order to produce a final extrudate which issues from die assembly 76. The degree of cook in the preconditioned material is determined by a measurement of the degree of gelatinization of the starch within the starting material fed to the preconditioner 12, and is dependent upon the processing conditions within the preconditioner (e.g., steam and/or water injection within the barrel 18, the rotational speeds of the shafts 20, 22, the geometries of the mixing elements 46, 48, and the residence time of the material within the preconditioner housing 18).

The feeder screw assembly 16 broadly includes an elongated, upright, open-ended two-piece housing 80, with a pair of upright auger conveyor screws 82, 84 within the housing 80, and a drive assembly 86 for selective rotation of the screws 82, 84. The general purpose of the assembly 16 is to positively convey preconditioned material from preconditioner outlet 38 toward and into the inlet 74 of extruder barrel 66. As used herein, "positive conveyance" refers to a situation where the screws 82, 84 impart motion to the preconditioned material, i.e., the material does not solely move under the influence of gravity.

In more detail, the housing 80 has the general appearance of a FIG. 8 in cross-section, and includes a stationary section 88 and a removable section 90. The section 88 has a lower, continuous, FIG. 8 flange 92 which is bolted to the upper face of the inlet 74 (see FIG. 3), and an upstanding arcuate wall 94 generally in the shape of two side-by-side half circles. The upper and lower ends of wall 94 have short abutment walls 94*a*, 94*b* which form complete FIG. 8 sections at the ends of the wall 94. A continuous, open-ended housing inlet 95 extends upwardly above the upper end of wall 94 and mates with the outlet 38 of preconditioner vessel 18. Finally, the section 88 includes a pair of upright apertured connection flanges 96 at the edges of wall 94.

The removable section 90 mates with the abutment walls 94*a*, 94*b* and has apertured side connection flanges 98, and an upright arcuate wall 100, which is substantially a mirror image of the wall 94, having the shape of two side-by-side half circles. The wall 100 mates with the abutment walls 94*a*, 94*b* to complete the FIG. 8 shape of the housing 80. Each of the half-circle sections of wall 100 has a rectangular observation port 106 allowing inspection of the internal space defined by the interconnected walls 94, 100. The ports 106 are normally covered by means of a block 108 extending through the port, with the block affixed to a pullout 110.

In use, the removable section 90 is bolted to the stationary section 88 by means of bolts extending through the mated connection flanges 96, 98, as best seen in FIG. 1. The upper inlet 95 above the walls 94, 100 is in mating engagement with and welded to the vessel outlet 38.

The screws 82, 84 are essentially identical and include an elongated shaft 112, 114 extending vertically from a point closely adjacent the screws 72, through the entirety of housing 80 and vessel 18, terminating above the sidewall 30, as best illustrated in FIG. 3. Each shaft 112, 114 carries auger flighting 116, 118 extending substantially throughout the vertical extent of housing 80 and into inlet 74 at a point closely adjacent the screw assemblies 72. The uppermost ends 112*a*, 114*a* are supported within a bearing block 120. The end 112*a*, 114*a* above bearing block 120 have a sprocket 122, 124, with the end 114*a* also being equipped with a rotary coupling 126. A continuous chain 128 is mounted on the sprockets 122, 124 for rotation of the shafts 112, 114 in unison.

The drive assembly 86 includes a variable speed motor 130 and a gear reducer 132. The output shaft 134 of gear reducer 132 is connected to shaft 114 via the coupler 126. Accordingly, actuation of the motor 130 serves to rotate the shafts 112, 114. In preferred forms, a controller 136 is operatively coupled between the motors 54 and 130 of the auger conveyor 58 and feeder screw assembly 16. The controller 136 may be of the same type as previously described controller 28, and if necessary VFDs may be employed in the same manner as the VFDs 56. The controller 136 and the variable speed motors 54, 130 provide an additional means of adjusting the residence time of the material being processed within preconditioner 12. That is, by selective adjustment of the speeds of the motors 54, 130, a desired residence time and weight of material can be established within preconditioner 12. Such control may be in lieu of the control provided by means of the previously-described load cells, or the two functions can be combined.

In use of processing apparatus 10, the feeder screw assembly 16 is fully assembled with the walls 94, 100 being interconnected. Material is then fed to preconditioner 12 by means of conveyor 58 while the preconditioner shafts 20, 22 are rotated so as to effect moisturization and partial cooking of the material. As preconditioned material reaches the outlet 38 and encounters the flighting 116, 118, the material is positively conveyed downwardly into the barrel inlet 74, where is it then conveyed forwardly via the extruder screw assemblies 68. If internal inspection of the housing 80 is required, the blocks 108 may be removed. At the end of a processing run, the removable section 90 is detached from the section 88 and inlet 74, thereby allowing easy clean-out of the feeder screw assembly 16. During the course of a processing run, the rotational speed of the shafts 112, 114 can be altered in concert with the speed of the screw 62 for residence time control through controller 136. At the same time, additional residence time control can be obtained by controller 28 adjusting the rotational speed and/or direction of the preconditioner shafts 20, 22.

It has been determined that use of the preferred feeder screw assembly 16 allows production of highly preconditioned materials. In one series of tests, a shrimp feed recipe containing soy meal and other starch-bearing ingredients were processed at a rate of 4400 lbs/hour using the preconditioner 12 (P/C) and feeder screw assembly 16, in order to measure the degree of cook of the starch fraction. The following Table sets forth the parameters of these tests:

| Run No. | P/C Material Weight | P/C Residence Time | P/C Steam Addition | P/C Water Addition | Screw Feeder Speed | P/C Shaft Speeds (20/22) |
|---|---|---|---|---|---|---|
| 1 | 272 lbs. | 3.02 min. | 8.68% | 14.98% | 50 rpm | 800/150 |
| 2 | 164 lbs. | 1.82 min. | 8.64% | 14.98% | 60 rpm | 800/300 |

Analysis of the preconditioned material revealed that the material in Run 1 cooked to a level of 45.3%, whereas in Run 2, the cook level was 57.5%. These are outstanding cooking results, particularly Run No. 2, where the residence time was significantly reduced yet the cook level was enhanced.

As indicated previously, a prime advantage of the feeder screw assembly 16 is the ability to positively convey preconditioned material directly into the inlet of an extruder barrel. In preferred forms, the ends of the screws 82, 84 terminate just above the extruder screw(s); advantageously, the distance between the lower ends of the screws 82, 84 and the extruder screw(s) should be no more than about 3 inches, and preferably less than about 2 inches. In addition, the upper end of the flighting 116, 118 should be very close to the outlet 38 of the preconditioner 18. Here again, the flighting should begin at a point as close as practicable, and preferably within about 10 inches from the opening, and more preferably within about 6 inches.

The closed nature of the feeder screw assembly 16 also permits pressurization of the preconditioner 12, something previously very difficult to achieve. Such pressurization is effectively obtained by material plugging or choking within the preconditioner 12 and the extruder 14, whereby both the preconditioner 12 and feeder screw assembly 16 are maintained above atmospheric pressure (preferably from about 10-250 psi above atmospheric). This permits more efficient preconditioning because injected steam is not immediately vented to the atmosphere. Accordingly, more steam can be incorporated into the material being processed, resulting in pressures above atmospheric and temperatures exceeding 212° F. (preferably from about 213-300° F.).

The assembly 16 also mitigates or completely eliminates the issues of possible contamination of the material being processed owing to the "open" nature of prior gravitational downspouts or transitions between preconditioners and extruders

I claim:

1. A method of extrusion processing a food or feed material, comprising the steps of:

preconditioning said material by passing the material through a preconditioner vessel from an inlet to an outlet, with moisture addition and continuous agitation between the inlet and the outlet to partially moisturize and precook the material;

positively conveying material from said outlet to the inlet of an extruder barrel, by rotating a pair of axially rotatable auger conveying screws having flighting extending from a point proximal to said outlet and into said extruder barrel, with the screws located within a substantially closed housing, said conveying step comprising the step of positively conveying said material substantially throughout the length of said housing; and passing said preconditioned and conveyed material through said extruder barrel and an endmost restricted orifice die, and heating the material while subjecting the material to levels of pressure and shear, in order to fully process the material.

2. The method of claim 1, including the step of maintaining a pressure above atmospheric and a temperature exceeding 212° F. within said preconditioner vessel and housing.

3. The method of claim 1, said extruder barrel having an upstanding inlet, said method including the step of positively conveying said material into the confines of said inlet.

4. The method of claim 1, including the step of rotating said screws in the same direction.

* * * * *